United States Patent
Lee et al.

(10) Patent No.: US 11,437,669 B2
(45) Date of Patent: Sep. 6, 2022

(54) BATTERY PACK

(71) Applicant: LG Chem, Ltd., Seoul (KR)

(72) Inventors: Youngho Lee, Daejeon (KR); Jeong Pyo Kong, Daejeon (KR); Soo Youl Kim, Daejeon (KR)

(73) Assignee: LG Energy Solution, Ltd.

( * ) Notice: Subject to any disclaimer, the term of this patent is extended or adjusted under 35 U.S.C. 154(b) by 166 days.

(21) Appl. No.: 16/631,083

(22) PCT Filed: Jan. 2, 2019

(86) PCT No.: PCT/KR2019/000033
§ 371 (c)(1),
(2) Date: Jan. 14, 2020

(87) PCT Pub. No.: WO2019/135595
PCT Pub. Date: Jul. 11, 2019

(65) Prior Publication Data
US 2020/0153059 A1    May 14, 2020

(30) Foreign Application Priority Data

Jan. 8, 2018 (KR) .................... 10-2018-0002354

(51) Int. Cl.
*H01M 10/6556* (2014.01)
*H01M 10/613* (2014.01)
*H01M 10/647* (2014.01)
*H01M 10/625* (2014.01)

(52) U.S. Cl.
CPC ..... *H01M 10/6556* (2015.04); *H01M 10/613* (2015.04); *H01M 10/625* (2015.04); *H01M 10/647* (2015.04)

(58) Field of Classification Search
CPC combination set(s) only.
See application file for complete search history.

(56) References Cited

U.S. PATENT DOCUMENTS

| 6,858,344 | B2 | 2/2005 | Marukawa et al. |
| 8,911,896 | B2 | 12/2014 | Jin |
| 10,305,078 | B1 * | 5/2019 | Harris, III ............. H01M 50/20 |

(Continued)

FOREIGN PATENT DOCUMENTS

| CN | 105655665 A * | 6/2016 | ............. Y02E 60/10 |
| CN | 107732061 A * | 2/2018 | ............. H01M 50/20 |

(Continued)

OTHER PUBLICATIONS

Extended European Search Report with Written Opinion for Application No. 19735822.9 dated May 14, 2020, 9 pages.

(Continued)

*Primary Examiner* — Kaity V Chandler
(74) *Attorney, Agent, or Firm* — Lerner, David, Littenberg, Krumholz & Mentlik, LLP

(57) ABSTRACT

A battery pack according to an exemplary embodiment of the present invention includes a plurality of unit modules consecutively disposed in a first direction, a unit cooling member having through-passages while being stacked with the unit modules, and a pressure member to press the unit cooling member. The through-passages of unit cooling members that are adjacent in the first direction are connected to allow a coolant to flow.

16 Claims, 7 Drawing Sheets

(56) References Cited

U.S. PATENT DOCUMENTS

| | | | | |
|---|---|---|---|---|
| 2008/0299446 | A1* | 12/2008 | Kelly | H01M 50/20 |
| | | | | 429/88 |
| 2011/0206967 | A1* | 8/2011 | Itsuki | H01M 10/6556 |
| | | | | 429/120 |
| 2012/0028099 | A1* | 2/2012 | Aoki | H01M 10/6555 |
| | | | | 429/120 |
| 2012/0177970 | A1* | 7/2012 | Marchio | H01M 50/10 |
| | | | | 429/120 |
| 2012/0315529 | A1* | 12/2012 | Jin | H01M 10/6556 |
| | | | | 429/120 |
| 2013/0022853 | A1* | 1/2013 | Protheroe | H01M 10/4207 |
| | | | | 429/120 |
| 2013/0344359 | A1* | 12/2013 | Ledbetter | H01M 10/6556 |
| | | | | 429/100 |
| 2014/0011059 | A1* | 1/2014 | Hashimoto | B60L 50/64 |
| | | | | 429/72 |
| 2014/0017545 | A1* | 1/2014 | Palanchon | H01M 10/6555 |
| | | | | 429/120 |
| 2014/0342195 | A1* | 11/2014 | Bhola | H01M 10/647 |
| | | | | 429/50 |
| 2015/0140388 | A1 | 5/2015 | Harada et al. | |
| 2015/0194712 | A1* | 7/2015 | He | H01M 10/4207 |
| | | | | 429/82 |
| 2015/0200429 | A1* | 7/2015 | Lee | H01M 10/613 |
| | | | | 429/120 |
| 2016/0164148 | A1* | 6/2016 | Yum | H01M 10/655 |
| | | | | 429/120 |
| 2017/0077565 | A1* | 3/2017 | Burrows | H01M 10/613 |
| 2017/0110773 | A1* | 4/2017 | Pucher | H01M 10/6556 |
| 2017/0200995 | A1 | 7/2017 | Phlegm et al. | |
| 2018/0138561 | A1 | 5/2018 | Lee et al. | |
| 2018/0191041 | A1* | 7/2018 | Jeon | H01M 10/6551 |
| 2018/0215282 | A1* | 8/2018 | Pohl | B60L 58/26 |
| 2019/0143836 | A1* | 5/2019 | Burrows | F28D 9/0081 |
| | | | | 429/120 |
| 2019/0173139 | A1* | 6/2019 | Kellner | H01M 10/6556 |
| 2019/0202307 | A1* | 7/2019 | Montgomery | H01M 10/615 |

FOREIGN PATENT DOCUMENTS

| | | | |
|---|---|---|---|
| DE | 102011107075 A1 | 3/2012 | |
| DE | 102011084536 A1 | 4/2013 | |
| DE | 102012218087 A1 | 4/2014 | |
| JP | 2003-036819 A | 2/2003 | |
| JP | 2012181972 A | 9/2012 | |
| JP | 2013-118195 A | 6/2013 | |
| JP | 2016-162530 A | 9/2016 | |
| KR | 10-1261736 B1 | 5/2013 | |
| KR | 10-2013-0081802 A | 7/2013 | |
| KR | 10-2016-0024187 A | 3/2016 | |
| KR | 10-2017-0051024 A | 5/2017 | |
| KR | 10-2017-0107798 A | 9/2017 | |
| WO | WO-2011092043 A1 * | 8/2011 | ......... H01M 10/615 |
| WO | WO-2013031614 A1 * | 3/2013 | ........ H01M 10/0459 |

OTHER PUBLICATIONS

International Search Report and Written Opinion for PCT Application No. PCT/KR2019/000033, dated Apr. 5, 2019, 7 pages.

* cited by examiner

BATTERY PACK

CROSS-REFERENCES TO RELATED APPLICATIONS

This application is a U.S. National Phase Application, pursuant to 35 U.S.C. § 371, of PCT/KR2019/000033, filed Jan. 2, 2019, designating the United States, which claims under 35 U.S.C. § 119(a) the benefit of Korean Application No. 10-2018-0002354, filed Jan. 8, 2018, the entire contents of which are incorporated by reference herein.

TECHNICAL FIELD

The present invention relates to a battery pack, and more particularly, to a battery pack mounted on a vehicle.

BACKGROUND ART

As environmental contamination become a more severe issue, the demand for hybrid vehicles and electric vehicles is increasing to reduce carbon emissions. Since the hybrid vehicles or the electric vehicles use charge and discharge energy of a battery pack to obtain operating power for the vehicles, they are well received by many consumers due to improved fuel efficiencies and reduced or no pollutant emissions over the vehicles that exclusively use engines.

Therefore, more attention and research are required for a vehicle battery, which is a key component of the hybrid vehicles or the electric vehicles.

The vehicle battery includes a plurality of unit cells such as a lithium ion battery, a lithium polymer battery, a nickel cadmium battery, a nickel hydrogen battery, and a nickel zinc battery, and the vehicle battery is used as a battery pack type in which the unit batteries are coupled in series or in parallel.

Since the volume increases as the battery pack contains more unit cells, to minimize the size, the plurality of unit batteries are densely disposed. In this case, since the unit cells generate heat during the charge or discharge process, when such heat is not discharged quickly in the densely packed state, deterioration of the unit cells may be accelerated and ignition or explosion may occur.

DISCLOSURE

Technical Problem

Accordingly, the present invention provides a battery pack having a cooling structure that is capable of rapidly discharging heat generated from the battery pack.

Technical Solution

A battery pack according to an exemplary embodiment of the present invention includes: a plurality of unit modules consecutively disposed in a first direction; a unit cooling member having through-passages while being stacked with the unit modules; and a pressure member to pressurize the unit cooling member. The through-passages of unit cooling members that are adjacent in the first direction are connected to allow a coolant to flow.

A lower surface of the unit modules and an upper surface of the unit cooling member may be in a surface contact.

The battery pack may further include a thermal interface material layer disposed between the lower surface of the unit modules and the upper surface of the unit cooling member.

The unit cooling member may be connected to the unit modules by welding.

The unit modules may include a case, the unit cooling member may form a bottom plate of the case, the case may include a side plate connected to the unit cooling member to form an inner space and an upper plate connected to the side plate to seal the inner space, and a rechargeable battery cell may be received within the inner space.

The unit cooling member may be thicker than the side plate.

The unit cooling member may be integrated with the side plate.

The pressure member may include a first pressure member having the through-passages connected to an inlet port and an outlet port, through which the coolant inflows and is discharged, and a second pressure member coupled with the first pressure member to press the unit cooling member.

The unit cooling member may be arranged in the first direction, and may include a first unit cooling member adjacent to the first pressure member, a third unit cooling member adjacent to the second pressure member, and at least one second unit cooling member disposed between the first unit cooling member and the third unit cooling member.

The first unit cooling member may have a first through-passage having a pair of linear through-passages respectively connected to the inlet port and the outlet port and a curved through-passage disposed between the linear through-passages and formed with both ends respectively opened toward the second unit cooling member. The second unit cooling member may have a second through-passage respectively connected to the both ends of the curved through-passage and extending in the first direction. The third unit cooling member may have a third curved through-passage having both ends opened toward the second unit cooling member and connecting adjacent second through-passages among the second through-passages.

Each unit cooling member may have a plurality of through-passages that extend in the first direction, and the through-passages of adjacent unit cooling members may be connected to each other.

The through-passages may be connected to the inlet port and the outlet port of the first pressure member, and the second pressure member may have a curved through-passage that connects the through-passages of the adjacent unit cooling members.

The through-passages may be disposed with a constant interval along a second direction perpendicular to the first direction.

The unit cooling member may be disposed between the first pressure member and the second pressure member, and the first pressure member and the second pressure member may be coupled by a coupling member that penetrates the unit cooling member.

A sealing member may be further disposed between unit cooling members that are adjacent in the first direction.

The passage may be formed in a zigzag shape.

Advantageous Effects

According to an exemplary embodiment of the present invention, due to the cooling structure, a safe battery pack may be provided without increasing the size of the battery pack.

In addition, by forming the cooling member per each unit module, the cooling member may be easily installed regardless of the size of the battery pack, thereby improving the safety of the battery pack.

MODE FOR INVENTION

Figure 1:
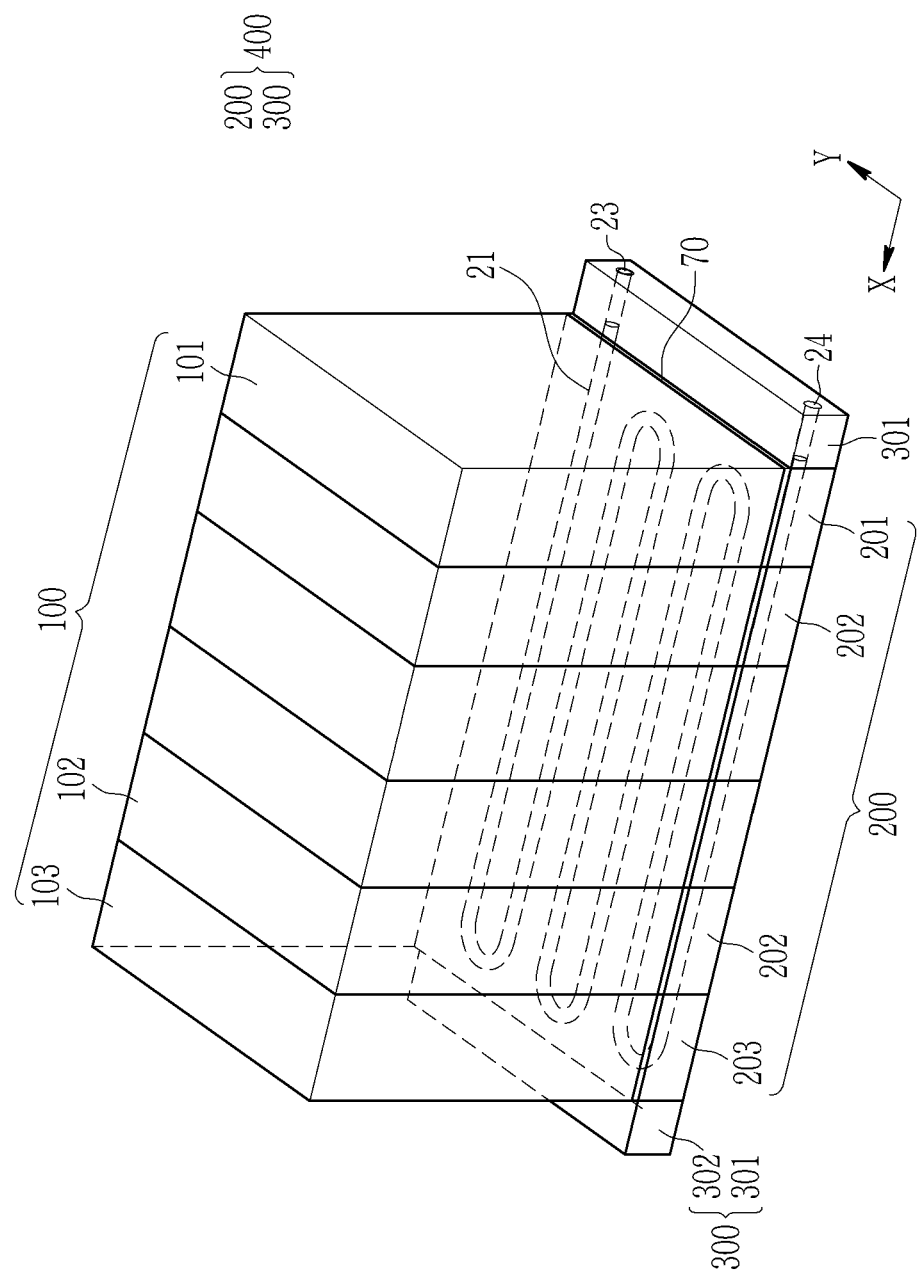
FIG. 1 is a schematic perspective view of a battery pack according to an exemplary embodiment of the present invention.

The present invention will be described more fully hereinafter with reference to the accompanying drawings, in which exemplary embodiments of the invention are shown.

Portions having no relationship with the description will be omitted in order to explicitly explain the present invention, and the same reference numerals will be used for the same or similar elements throughout the specification.

Further, in the following detailed description, names of constituents which are in the same relationship are divided into "the first", "the second", and the like, but the present invention is not limited to the order in the following description. In addition, unless explicitly described to the contrary, the word "comprise" and variations such as "comprises" or "comprising" will be understood to imply the inclusion of stated elements but not the exclusion of any other elements.

In addition, terminology such as "member," which is disclosed in the specification, refers to a unit of an inclusive constituent which performs at least one of the functions and operations.

Hereinbelow, a battery pack according to an exemplary embodiment of the present invention is described with reference to accompanying drawings.

A battery pack according to an exemplary embodiment of the present invention may be provided in a vehicle as a vehicle power source.

The battery pack may be equipped in an electric vehicle, a hybrid vehicle, or any other type of vehicle in which the battery pack may be used as a power source. The battery pack may also be provided in other devices such as an electrical energy storage system, an apparatus, a facility, and the like, which use a rechargeable battery.

Figure 2:
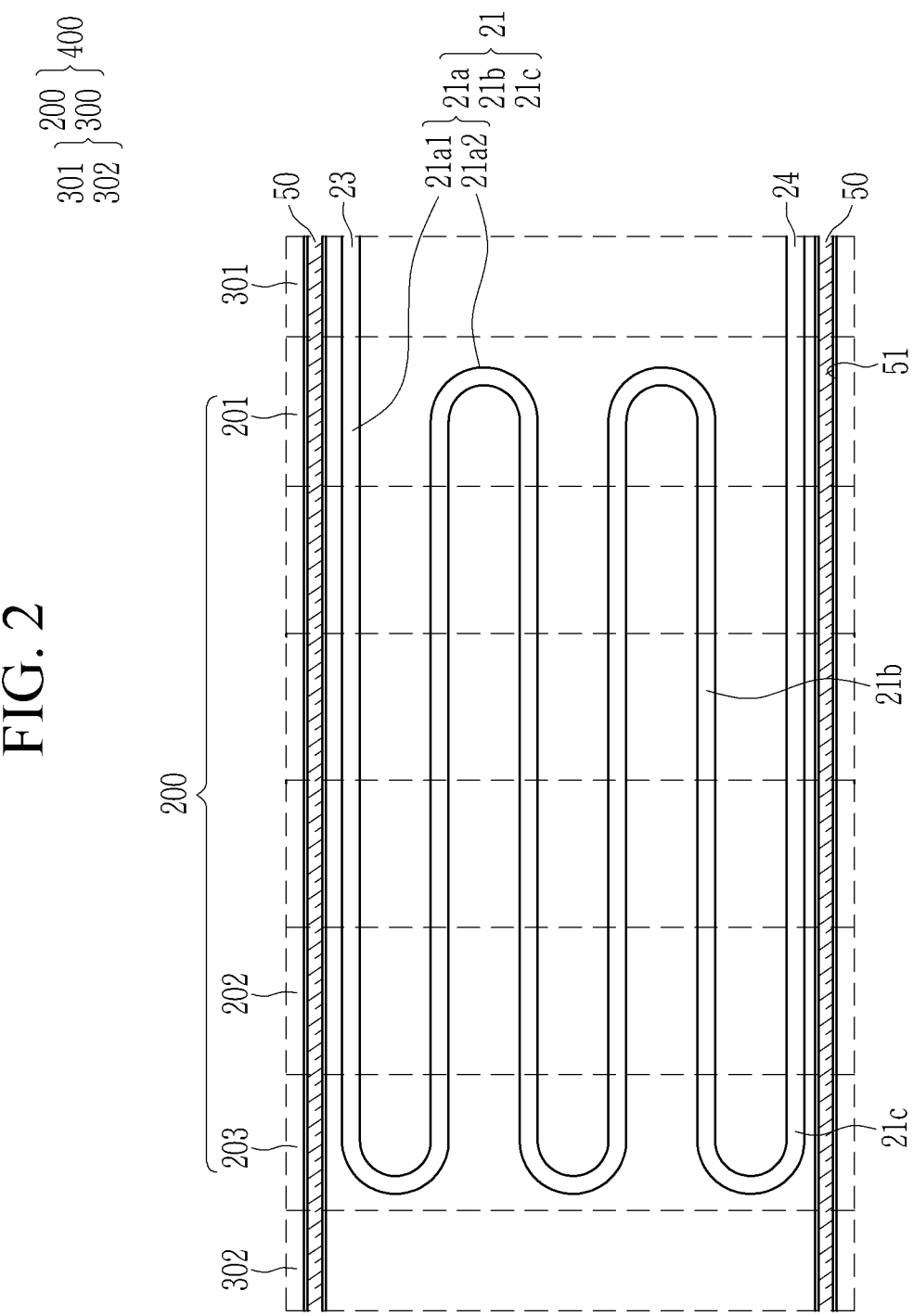
FIG. 2 is a top plan view of through-passage according to an exemplary embodiment of the present invention.

FIG. 1 is a schematic perspective view of a battery pack according to an exemplary embodiment of the present invention, and FIG. 2 is a top plan view of through-passage according to an exemplary embodiment of the present invention.

As shown in FIG. 1, a battery pack 1000 includes a plurality of unit modules 100 which are electrically connected, and a cooling member 400 connected to the unit module.

Each unit module 100 includes a case and a rechargeable battery cell inserted in the case.

The cell includes an assembly in which a positive electrode plate, a separator, and a negative electrode plate are stacked, the cell may be sealed in a case together with an electrolyte, and terminals respectively connected to the positive electrode plate and the negative electrode plate may be disposed outside the case.

In a case in which a plurality of unit modules 100 are disposed consecutively in the first direction X, when the unit module 100 disposed at the frontmost side is referred to as a first unit module 101 and the last unit module is referred to as a third unit module 103, the unit module disposed between the first unit module 101 and the third unit module 103 is referred to as a second unit module 102.

The battery pack 1000 may include one first unit module 101, one third unit module 103, and at least one second unit module 102.

The cooling member 400 includes a unit cooling member 200 disposed under each unit module 100 and a pressure member 300 that presses the unit cooling member 200.

Each unit cooling member 200 may be welded to the lower surface of the unit module 100, and the upper surface of the unit cooling member 200 and the lower surface of the unit module 100 may be connected by surface contact. In particular, the welding may be performed along the circumference of the surface where the unit cooling member 200 and the unit module 100 abut.

Accordingly, the welding improves mechanical rigidity between the unit cooling member 200 and the unit module 100, thereby suppressing the degradation (or plastic deformation) of a thermal interface material layer 70, which will be described later, and the cooling performance may be maintained for an extended period of time due to a reduced thermal resistance loss during a lifespan of the battery pack.

Referring to FIG. 1 and FIG. 2, each unit cooling member 200 includes a through-passage 21 that penetrates the unit cooling member 200. The unit cooling member 200 may include a first unit cooling member 201, a second unit cooling member 202, and a third unit cooling member 203 depending on the shape of the through-passage 21 formed inside. The second unit cooling member 202 is disposed between the first unit cooling member 201 and the third unit cooling member 203, and at least one second unit cooling member 202 may be disposed.

The first unit cooling member 201 may be disposed under the first unit module 101, the second unit cooling member 202 may be disposed under the second unit module 102, and the third unit cooling member 203 may be disposed under the third unit module 103. A coolant may flow through the through-passage 21 that passes through the first unit cooling member 201, the second unit cooling member 202, and the third unit cooling member 203.

More specifically, a first through-flow passage 21a formed in the first unit cooling member 201 includes a linear through-passage 21a1 and a curved through-passage 21a2. The linear through-passage 21a1 extends in one direction, and has an aperture that penetrates the first unit cooling member 201, and the aperture is opened at both sides of the first unit cooling member 201.

The linear through-passages 21a1 are formed in pairs, and may be disposed on both sides of the curved through-passage 21a2, respectively.

Both ends of the curved through-passage 21a2 may be disposed at one side of the first unit cooling member 201, and both ends may be opened toward the second unit cooling member 202.

The second through-passage 21b of the second unit cooling member 202 may extend in a first direction X to penetrate the second unit cooling member 202, and at least one second through-passage 21b may be formed within the second unit cooling member 202. When a plurality of second through-passages 21b are formed, the second through-passages 21b may be disposed in parallel with a predetermined interval along a second direction Y that is perpendicular to the first direction X. In particular, the second through-passage 21b is disposed to be connected to the first through-passage 21a.

A third through-passage 21c of the third unit cooling member 203 is a curved through-passage, and both ends thereof are disposed at one side of the third unit cooling member 203 and opened toward the second unit cooling member 202. The third through-passage 21c is disposed to be connected to the second through-passage 21b.

Accordingly, the entire passage is connected to an inlet port 23 and a discharge port 24 formed at one side of the battery pack 1000, and the entire passage may be formed in a zigzag shape. In particular, the interval between adjacent linear through-passages 21a1 may be constant.

In addition, when the unit cooling members 200 are connected to each other, the adjacent unit cooling members 200 may be disposed to be in a close contact to prevent leakage from occurring between the adjacent passages.

The pressure member 300 is disposed on the outer periphery of the unit cooling members 200, and presses the unit cooling members 200 to allow the unit cooling members 200 to be more closely disposed.

Accordingly, the pressure member 300 includes a first pressure member 301 and a second pressure member 302 disposed on respective sides of the unit cooling member 200. Further, the first pressure member 301 is disposed to be in close contact with the first unit cooling member 201, and the second pressure member 302 is disposed to be in close contact with the third unit cooling member 203. Accordingly, in the first pressure member 301, the inlet port 23 and the discharge port 24 connected to the linear through-passage 21a1 of the first unit cooling member 201 may be formed to allow inflow and discharge of the coolant.

The first pressure member 301 and the second pressure member 302 may be coupled to each other via a coupling member 50 disposed within a through hole 51 formed in the first and second pressure members 301 and 302. For example, the coupling member 50 may be implemented as a screw having threads, and a coupling aperture may be formed in the coupling member 50 to receive the screw. Further, a structure for rotating the screw may be formed at one end of the screw. Depending on a degree of tightening of the coupling member 50, the tightness of the contact between the unit cooling members 200 may be adjusted.

The coupling members 50 may be formed in pairs to be disposed on both sides of the cooling member with respect to the passage formed in the cooling member, but the present invention is not limited thereto. In order to uniformly pressurize the unit cooling member 200, three or more coupling members (not shown) may be formed with a predetermined interval to allow a constant pressure to be applied depending on the width of the unit module 100 or the length of the battery pack.

Each through hole 51 may be disposed to form one long hole by a first hole that penetrates the first pressure member 301 and the second pressure member 302, and a second hole that penetrates the unit cooling member 200.

In an exemplary embodiment of the present invention, when the unit cooling member 200 is connected through the coupling member 50, since the plurality of unit modules 100 are connected by the coupling member 50, the plurality of unit modules 100 may be easily aligned in one direction.

Further, the thermal interface material (TIM) layer 70 may be formed between the unit module 100 and the unit cooling member 200. As the thermal interface material layer 70 planarizes the surface by removing protrusions and depressions between the unit module 100 and the cooling member 400, heat exchange between the unit module 100 and the cooling member 400 is more easily performed. The thermal interface material layer 70 may be formed by coating one surface of the cooling member 400 or the unit module 100, and may be a material such as, for example, a thermal grease, an epoxy material, and the like.

As shown in the present invention, due to the cooling member 400, the circulation structure, in which the coolant inflows from one side of the unit module 100, cools the battery pack 1000 by being in a thermal contact with the lower surface of the unit module 100, and subsequently is discharged to one side of the battery pack 1000, is formed.

According to an exemplary embodiment of the present invention, the unit module is connected to each of the unit modules, thereby improving the safety of the battery pack by rapidly cooling the battery pack by forming the cooling member regardless of the size and arrangement of the unit module.

Figure 3:
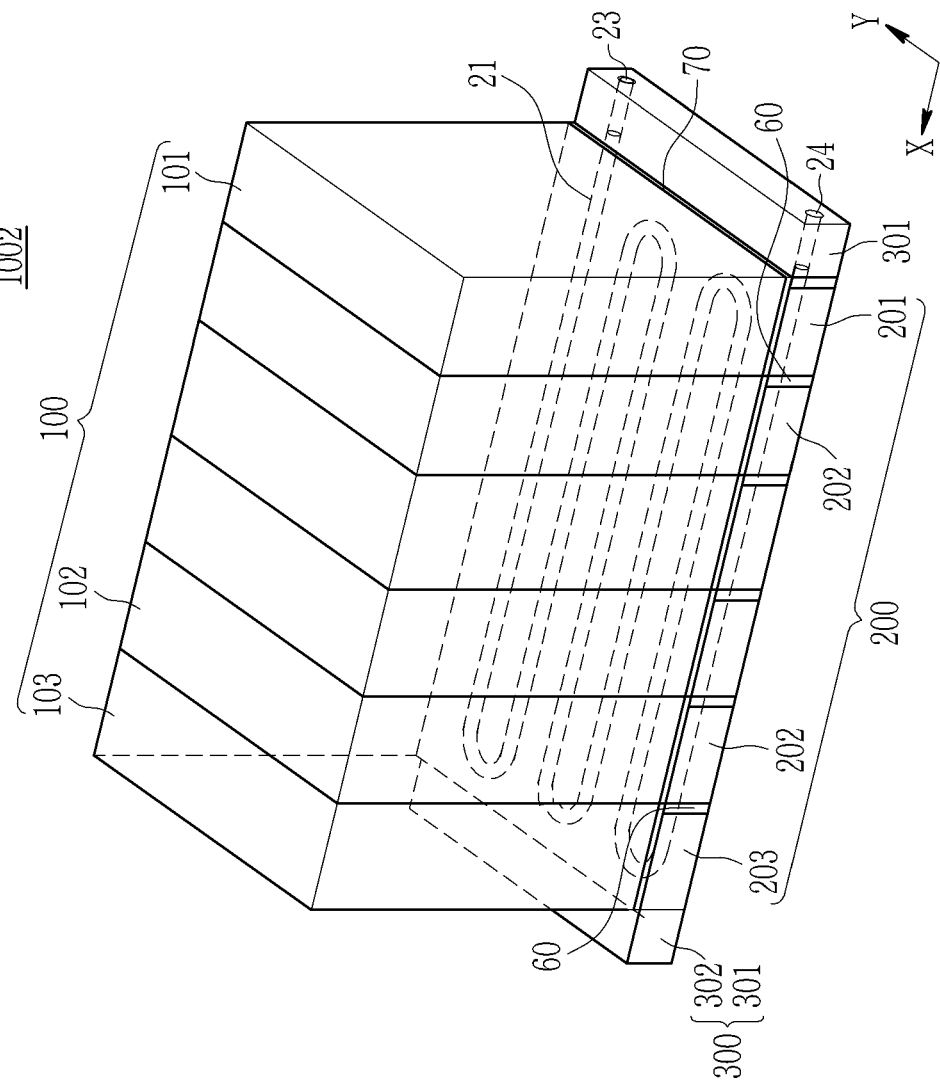
FIG. 3 and FIG. 5 are schematic perspective views of a battery pack according to other exemplary embodiments of the present invention.
Figure 4:
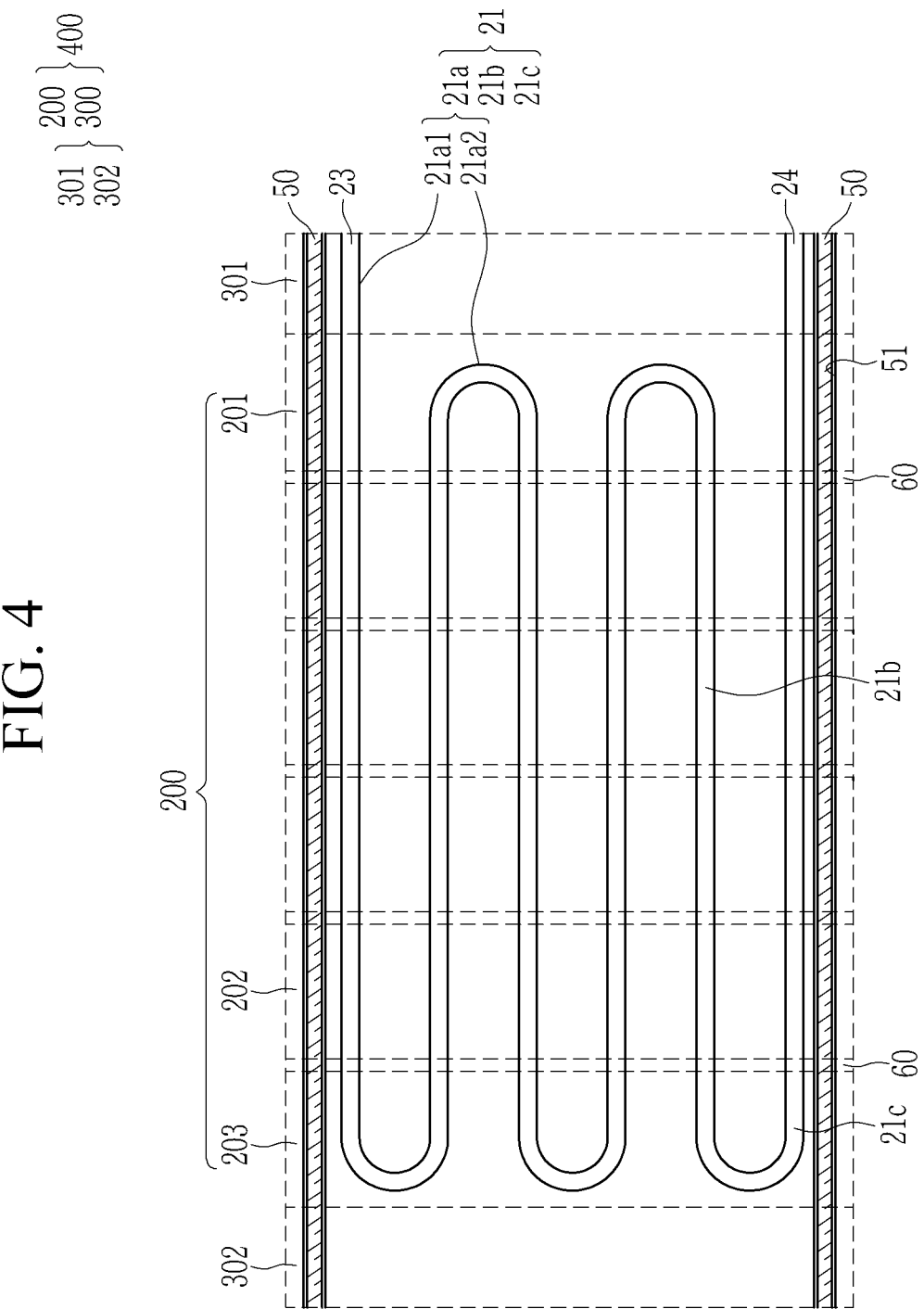
FIG. 4 and FIG. 6 are schematic top plan views showing a through-passage formed in the exemplary embodiments of the present invention shown in FIG. 3 and FIG. 5, respectively.
Figure 5:
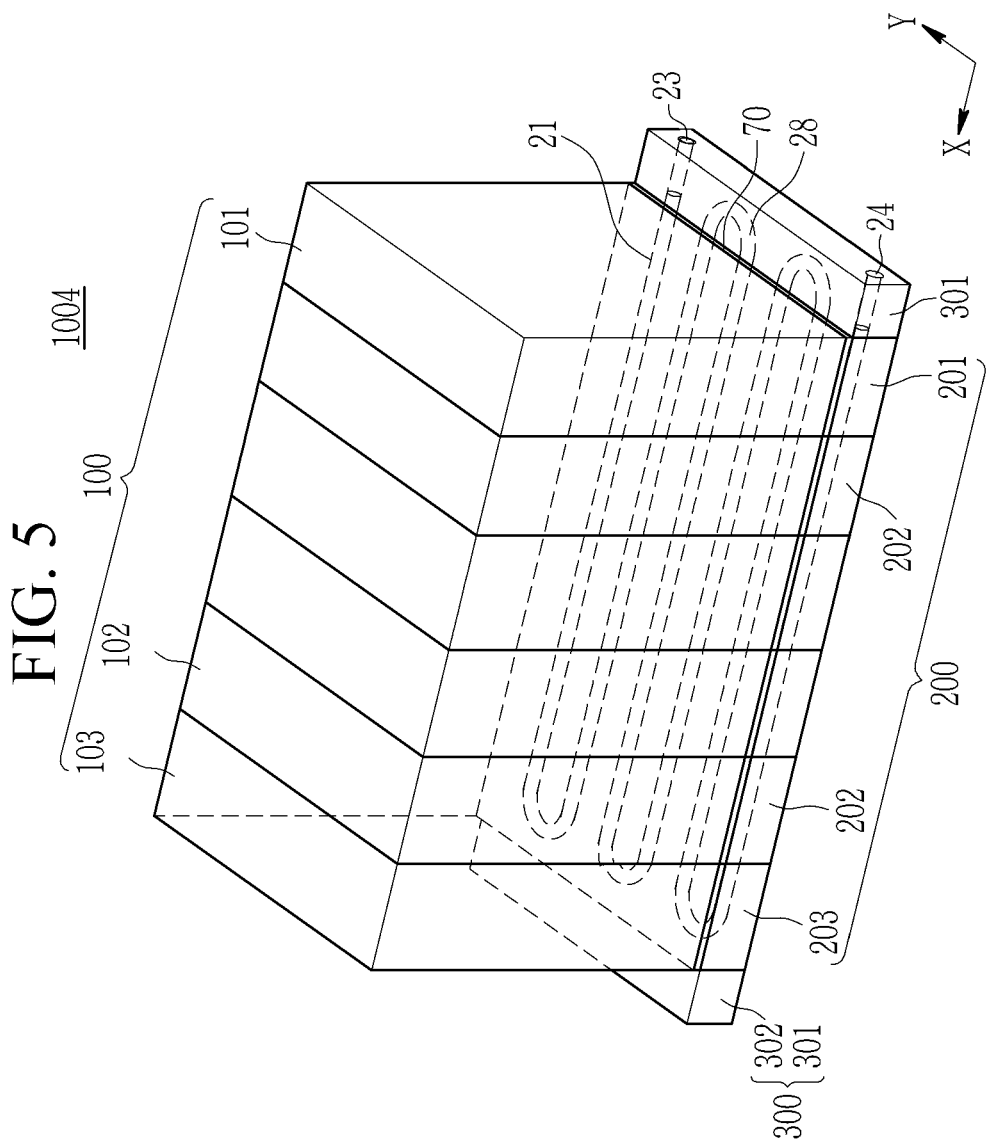
Figure 6:
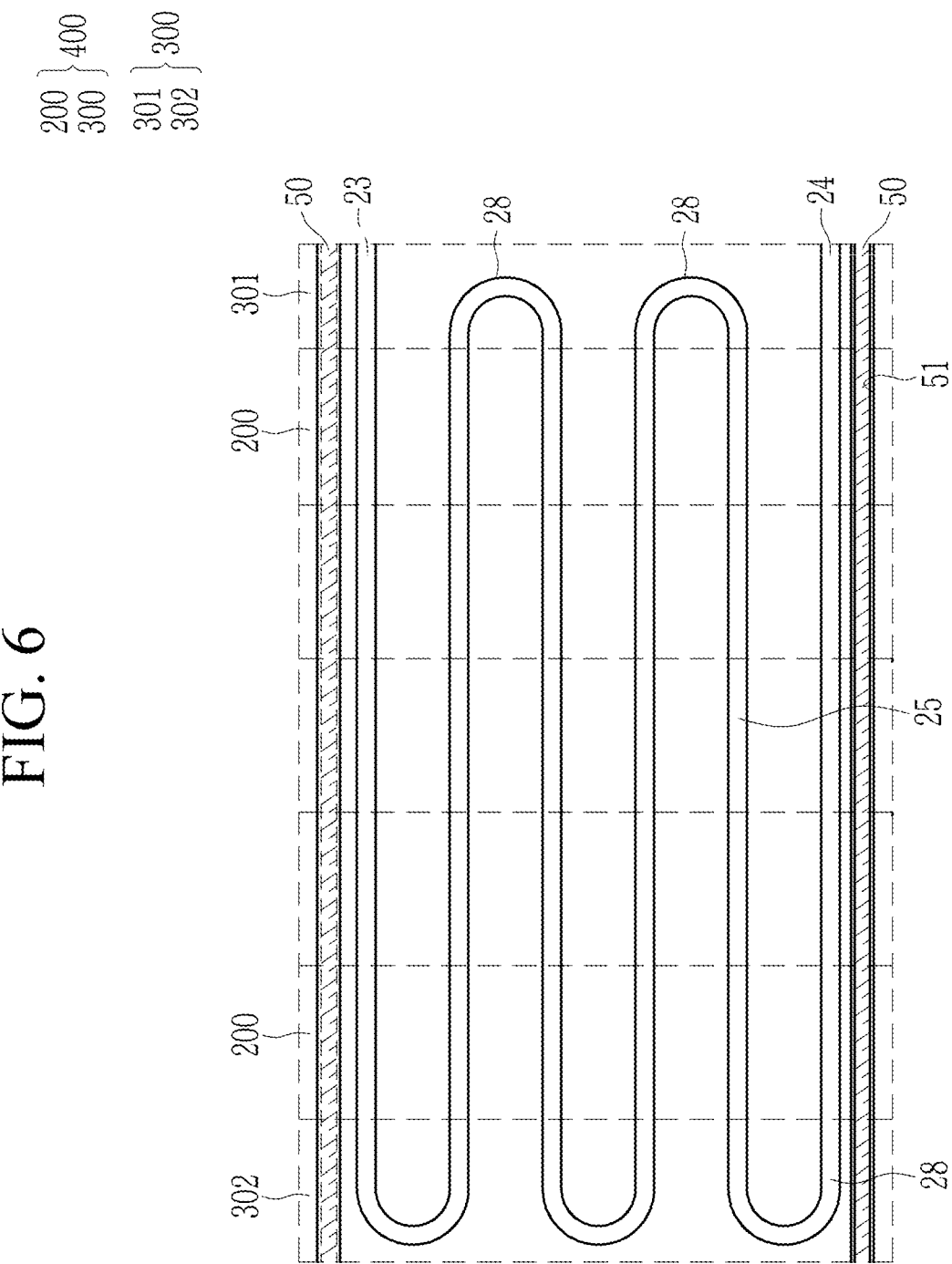

FIG. 3 and FIG. 5 are schematic perspective views of a battery pack according to other exemplary embodiments of the present invention, and FIG. 4 and FIG. 6 are schematic top plan views showing a through-passage formed in the exemplary embodiments of the present invention shown in FIG. 3 and FIG. 5, respectively.

A battery pack 1002 of FIG. 3 and FIG. 4 is substantially same as the battery pack of FIG. 1, and therefore, only differences are described in detail herein.

As shown in FIG. 3 and FIG. 4, the battery pack 1002 according to another exemplary embodiment of the present invention includes the plurality of unit modules 100 and the cooling member 400 connected to the lower portion of the unit module 100. The cooling member 400 includes a plurality of unit cooling member 200 and a pressure member 300 that presses the unit cooling members 200.

The battery pack 1002 of FIG. 3 and FIG. 4 may further include a sealing member 60 for increasing the tightness between the adjacent unit modules 100. The sealing member 60 may be formed of a material having elasticity, heat resistance, and chemical resistance. The sealing member 60 may be formed on the side where the unit cooling members 200 are closely contacted, or may be formed as a separate member and then disposed between the unit cooling members 200 before coupling thereof.

As shown in FIG. 5 and FIG. 6, a battery pack 1004 according to the present exemplary embodiment of the invention includes a plurality of unit modules 100 and the cooling member 400 connected to the lower portion of the unit module 100. The cooling member 400 includes the plurality of unit cooling members 200 and the pressure member 300 that presses the unit cooling members 200.

Each of the unit cooling members 200 of FIG. 5 and FIG. 6 has a through-passage 25 with the same configuration, and the unit cooling member 200 having the same through-passage 25 is disposed regardless of the position of the unit module 100.

The first pressure member 301 includes the inlet port 23 and the outlet port 24 of the entire passage that are connected to the through-passage 25 of the unit cooling member 200, to allow the coolant to be transported, and a curved through-passage 28 for connecting the adjacent through-passages 25 formed in the unit cooling member 200.

The second pressure member 302 includes the curved through-passage 28 that connect adjacent through-passages 25 formed in the unit cooling member 200.

In FIG. 5 and FIG. 6, by forming the curved through-passage 28 for connecting the through-passages 25 of the unit cooling member 200 in the first pressure member 301 and in the second pressure member 302, the through-passage 25 of the same configuration may be formed in the unit cooling member 200.

Therefore, the process of selecting and disposing the through-passage 25 based on the position of the unit module 100 may be omitted.

In the above exemplary embodiment, it is described that the cooling member is connected to the unit module by welding, but the present invention is not limited thereto.

Figure 7:
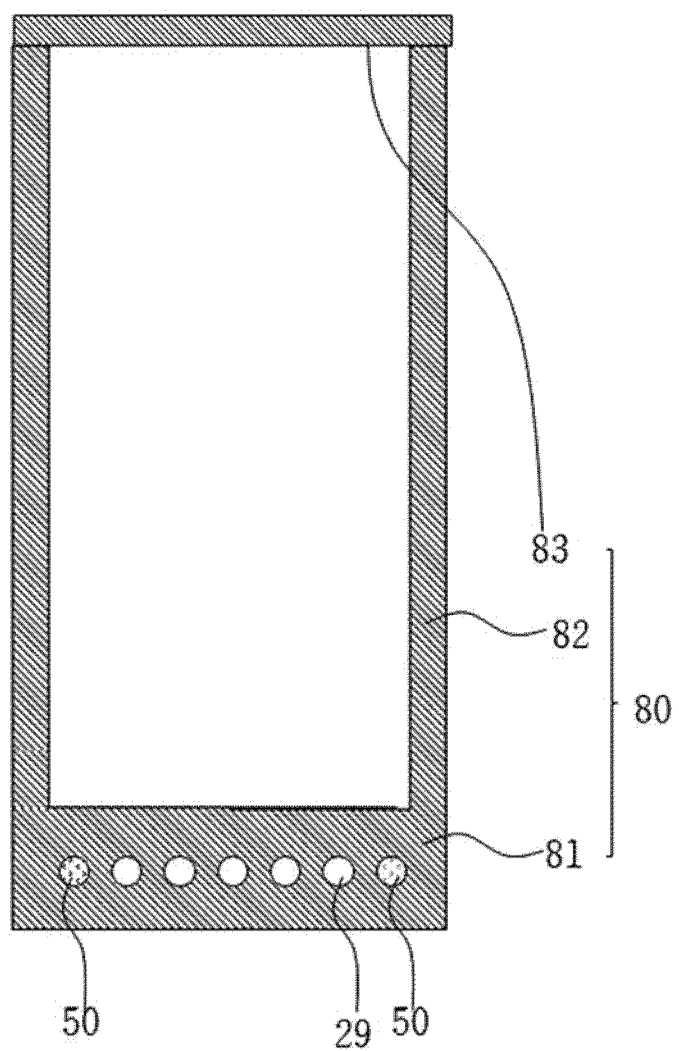
FIG. 7 is a schematic cross-sectional view of a battery pack according to another exemplary embodiment of the present invention.

FIG. 7 is a schematic cross-sectional view of a battery pack according to another exemplary embodiment of the present invention.

In the battery pack 1006 shown in FIG. 7, the unit cooling member 200 may be integrated with a case 80 that constitutes the unit module 100, and for example, may be the bottom plate 81 of the case 80.

To form the space in which the rechargeable battery cell is received, the case 80 includes a bottom plate 81, a side plate 82 that encloses the bottom plate 81 and forming the inner space, and an upper plate 83 disposed at a position opposite to the bottom plate 81 and sealing the inner space.

The upper plate 83, the side plate 82, and the bottom plate 81 may be formed of the same material, for example, aluminum, and the upper plate 83 may be coupled to the side plate 82 by welding after the cell is inserted.

Since a through-passage 29 that forms the passage through which the coolant is transported is formed in the bottom plate 81, a thickness T1 of the bottom plate 81 may be greater than a thickness T2 of the side plate 82.

Since the case 80 is formed by an extrusion molding method, the through-passage 29 may be processed after the thickness of the bottom plate is selectively formed during the extrusion molding process, based on the size of the passage.

In this way, since the heat exchange is directly performed through the bottom plate by forming the passage directly in the bottom plate of the case, the thermal interface material layer may be not formed at the interface between the cooling member and the unit module. In addition, the welding process to connect the unit module and the unit cooling member may be omitted.

While this invention has been described in connection with exemplary embodiments, it is to be understood that the invention is not limited to the disclosed embodiments, but is intended to cover various modifications and equivalent arrangements included within the spirit and scope of the appended claims

DESCRIPTION OF SYMBOLS

60: sealing member
70: thermal interface material
80: case
100: unit module
200: unit cooling member
300: pressure member
301: first pressure member
302: second pressure member
400: cooling member
1000, 1002, 1004, 1006: battery pack

The invention claimed is:

1. A battery pack comprising:
a plurality of unit modules consecutively disposed along an axis, each of the unit modules including a rechargeable battery cell; and
a plurality of unit cooling members stacked along the axis to form a cooling block positioned below the unit modules in a first direction that is perpendicular to the axis, such that each of the plurality of unit cooling members is positioned below a respective one of the plurality of unit modules;
wherein each of the unit cooling members includes a plurality of through-passages extending therethrough, such that each of the through-passages extends from a first opening on a first side of the respective unit cooling member to a second opening on a second side of the respective unit cooling member, the first and second sides being opposite to one another along the axis;
wherein each successive one of the plurality of unit cooling members along the axis is positioned adjacent to a previous one of the plurality of unit cooling members such that the first side of the successive unit cooling member abuts the second side of the previous unit cooling member, with each of the first openings on the first side of the successive unit cooling member being in communication with a respective one of the second openings on the second side of the previous unit cooling member;
wherein the plurality of through-passages in the cooling block are serially connected together to define an elongate cooling passage extending along a serpentine path across the cooling block, such that a cooling fluid advancing along the serpentine path passes from a first one of the through-passages extending through a first one of the unit cooling members to a first one of the through-passages extending through a second one of the cooling members, after which the cooling fluid passes through a second one of the through-passages extending through the second one of the unit cooling members and then passes through a second one of the through-passages extending through the first one of the unit cooling members, wherein the second unit cooling member is adjacent to the first cooling member along the axis.

2. The battery pack of claim 1, wherein a lower surface of the unit modules and an upper surface of the cooling block are in a surface contact.

3. The battery pack of claim 2, further comprising:
a thermal interface material layer disposed between the lower surface of the unit modules and the upper surface of the cooling block.

4. The battery pack of claim 2, wherein the cooling block is connected to the unit modules by welding.

5. The battery pack of claim 1, wherein each of the unit modules includes a case,
wherein each of the unit cooling members forms a bottom plate of a respective one of the cases, and each of the cases includes a side plate connected to the respective unit cooling member to form an inner space and an upper plate connected to the side plate to seal the inner space, and
wherein a respective one of the rechargeable battery cells is received within the inner space.

6. The battery pack of claim 5, wherein the unit cooling members are thicker than the respective side plates.

7. The battery pack of claim 6, wherein the unit cooling members are integrated with the respective side plates.

8. The battery pack of claim 1, further comprising:
a sealing member disposed between adjacent ones of the plurality of unit cooling members along the axis.

9. The battery pack of claim 1, further comprising a pressure member configured to apply a compression force along the axis to the unit cooling members constituting the cooling block.

10. The battery pack of claim 9, wherein the pressure member comprises:
a first pressure member having an inlet port and an outlet port, the cooling fluid inflowing into the elongate cooling passage of the cooling block through the inlet port, and the cooling fluid being discharged from the elongate cooling passage of the cooling block through the outlet port; and
a second pressure member coupled with the first pressure member so as to apply the compression force along the axis.

11. The battery pack of claim 10, wherein the cooling block comprises:
an initial unit cooling member adjacent to the first pressure member;
an end unit cooling member adjacent to the second pressure member; and
at least one intermediate unit cooling member disposed between the initial unit cooling member and the end unit cooling member.

12. The battery pack of claim 11, wherein the initial unit cooling member includes:
a first linear through-passage connected to the inlet port;
a second linear through-passage connected to the outlet port; and
a curved through-passage disposed between the first and second linear through-passages, wherein both ends of the curved through-passage are open towards the at least one intermediate unit cooling member,
wherein the at least one intermediate unit cooling member has a respective through-passage connected to each of both ends of the curved through-passage of the initial unit cooling member and extending along a direction of the axis, and
wherein the end unit cooling member has a curved through-passage having both ends open towards the at least one intermediate unit cooling member and connecting two adjacent through-passages of the at least one intermediate unit cooling member.

13. The battery pack of claim 11, wherein the plurality of through-passages through each unit cooling member extend along a direction of the axis.

14. The battery pack of claim 13, wherein the plurality of through-passages through each unit cooling member communicate with the inlet port and the outlet port of the first pressure member, and
wherein the second pressure member is adjacent to the end unit cooling member, the second pressure member having a curved through-passage to connect together adjacent through-passages of the end unit cooling member.

15. The battery pack of claim 13, wherein the plurality of through-passages through each unit cooling member are spaced apart from one another by a constant interval along the first direction.

16. The battery pack of claim 10, wherein the cooling block is disposed between the first pressure member and the second pressure member, and
wherein the first pressure member and the second pressure member are coupled together by a coupling member that penetrates through the cooling block.

* * * * *